Figure 1:
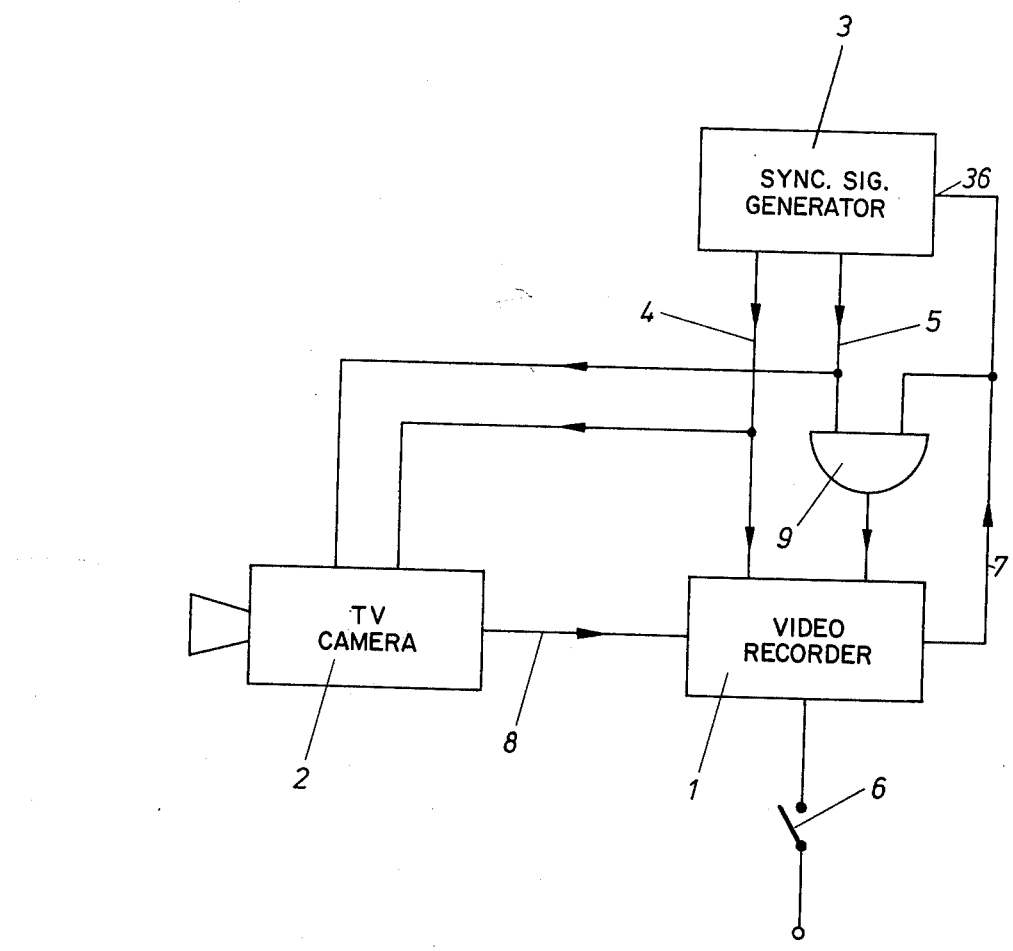

United States Patent [19]

Bragas

[11] 4,280,149
[45] Jul. 21, 1981

[54] EQUIPMENT FOR PREVENTING GAPS BETWEEN PREVIOUSLY RECORDED AND NEWLY RECORDED INFORMATION ON AN INFORMATION CARRIER

[75] Inventor: Peter Bragas, Hildesheim-Itzum, Fed. Rep. of Germany

[73] Assignee: Blaupunkt-Werke GmbH, Hildesheim, Fed. Rep. of Germany

[21] Appl. No.: 81,621

[22] Filed: Oct. 4, 1979

[30] Foreign Application Priority Data

Oct. 14, 1978 [DE] Fed. Rep. of Germany ....... 2844897

[51] Int. Cl.³ .............................................. H04N 5/795
[52] U.S. Cl. ........................................ 360/14; 360/33; 360/70
[58] Field of Search ....................... 360/14, 33, 35, 37, 360/70

[56] References Cited

U.S. PATENT DOCUMENTS

| | | | |
|---|---|---|---|
| 3,402,257 | 9/1968 | De Lange | 360/37 |
| 4,163,263 | 7/1979 | Rotter | 360/14 |
| 4,175,271 | 11/1979 | Kaemmerer | 360/14 |

Primary Examiner—Raymond F. Cardillo, Jr.
Attorney, Agent, or Firm—Frishauf, Holtz, Goodman & Woodward

[57] ABSTRACT

A television camera is synchronized by horizontal and vertical synchronization signals furnished by a signal generator. When the equipment is switched to a recording mode, that is when new information is to be added to previously recorded information, the reproducing-recording equipment is switched to the reproducing phase very briefly so that the last-recorded information is read out. Vertical synchronization signals are separated from the so read out information and are applied to the synchronizing input of the above-mentioned signal generator.

5 Claims, 2 Drawing Figures

EQUIPMENT FOR PREVENTING GAPS BETWEEN PREVIOUSLY RECORDED AND NEWLY RECORDED INFORMATION ON AN INFORMATION CARRIER

The present application relates to video recording and reproducing equipment. In particular, it relates to equipment wherein new information is to be recorded without a gap following previously recorded information.

BACKGROUND AND PRIOR ART

In known equipment of the above-described type, synchronization is achieved by reproducing a brief part of the end of the previously recorded information; that is, a magnetic head scans this previously recorded information and the vertical synchronization signals are separated from the signals at the output of the magnetic head. The so-separated vertical synchronization signals are subjected to a phase comparison with the vertical synchronization signals from a video signal source, for example a television camera. The tape advance is then so-synchronized to the vertical synchronization signals from the video signal source that, upon initiation of the recording mode, the vertical synchronization pulses from the video signal source coincide in time with the vertical synchronization signals derived from the magnetic head during the brief reproducing interval.

It is a disadvantage of the above-described method that a relatively long time is required until the synchronization is achieved.

THE INVENTION

It is an object of the present invention to shorten the time required to achieve synchronization when a plurality of individual video information sections are to be recorded in sequence.

In accordance with the invention, means are interconnected between the read/write means (magnetic head) and a signal generator means furnishing vertical and horizontal synchronization signals to the television camera to synchronize the signal generator to reproduced synchronization signals derived from the information carrier (tape) during a brief reproducing phase. The camera is thus immediately synchronized to the signals from the tape, eliminating the longer time required to synchronize the tape drive to the latter.

In a particularly preferred embodiment of the invention, the equipment is automatically switched to the recording mode upon coincidence between the vertical synchronization signals derived from the video signals generator and the reproduced video synchronization signals.

The automatic switching means are, in the simplest case, embodied in an AND gate which has a first input connected to the output of the synchronization signal generator, a second input connected to a synchronization signal separator separating the vertical synchronization signals from the signals read out by the magnetic head, and an output connected to enable a mode selector to be switched to the recording mode.

It is a particular advantage of the present invention that the time required to achieve synchronization of a number of separately recorded information sections is greatly decreased without a great increase in the required equipment. When a microprocessor is already present, such a microprocessor can be utilized further to carry out the present invention.

DRAWINGS DESCRIBING A PREFERRED EMBODIMENT

Figure 2:
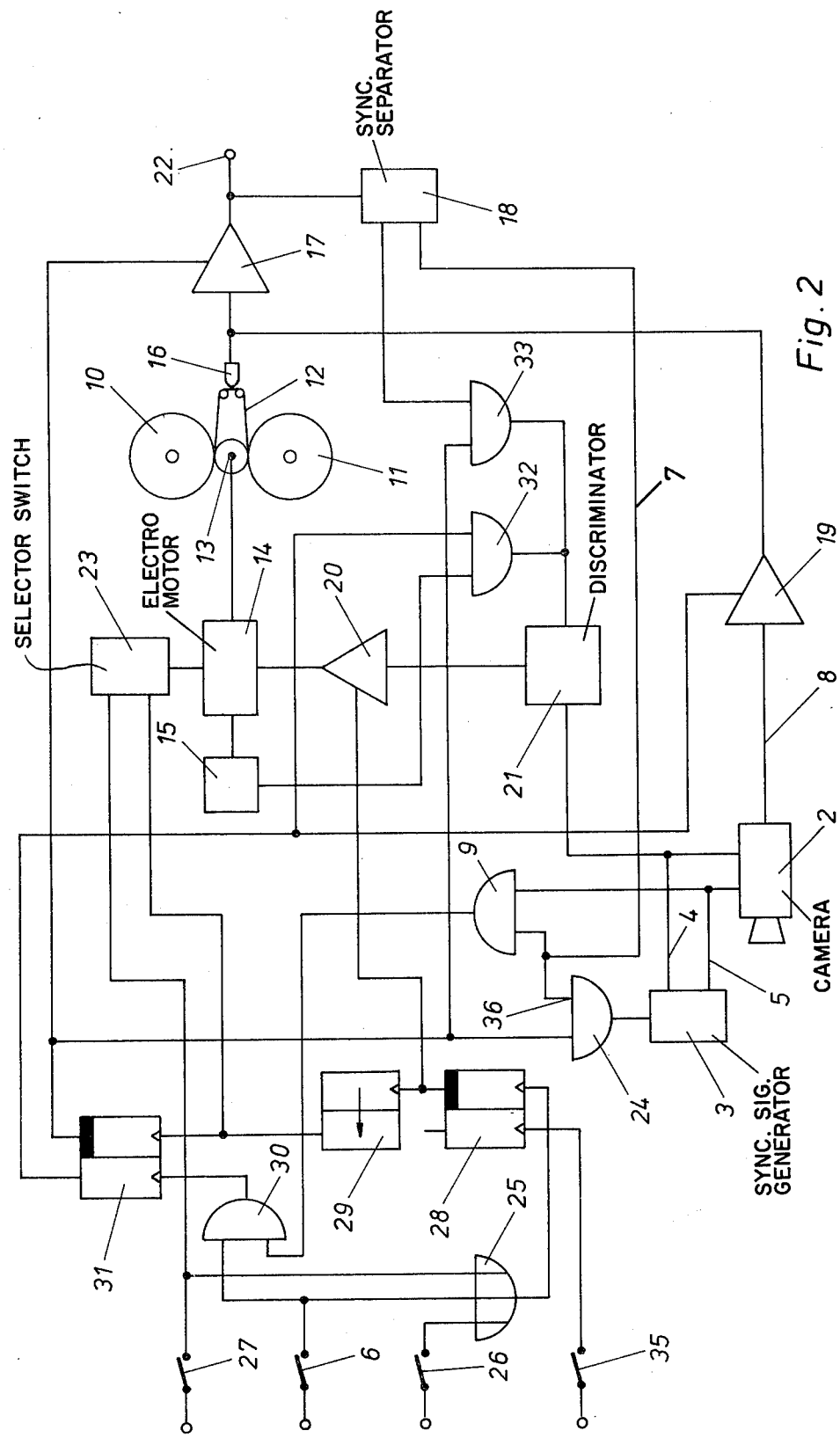

FIG. 1 is a block diagram of recording and reproducing equipment including a television camera and a synchronization signal generator; and FIG. 2 is a more detailed block diagram of the equipment shown in FIG. 1.

In FIG. 1, reference numeral 1 denotes a video recording and reproducing unit to which the video signals derived from a television camera 2 are applied via a line 8. A signal generator 3 furnishes horizontal and vertical synchronization signals which are applied to the television camera 2 via lines 4 and 5, respectively. The scanning of the image by the television camera is synchronized by these so-applied signals. Video recording and reproducing unit 1 includes a tape advance which is synchronized by the horizontal synchronization signals applied to unit 1 via line 4.

When new information is to be recorded, switch 6 is activated, which causes a control voltage to be applied to unit 1. This initiates the recording of the new information section by first initiating a reproduction of a brief portion of the end section of the previously recorded material. During this reproduction, the magnetic head scans the information on the tape, synchronizing signal generator 3 is synchronized to the vertical synchronization signals derived from the magnetic head and, when coincidence is achieved between the vertical synchronization signals furnished by unit 1 and those derived from signal generator 3, the equipment is switched from the reproducing to the recording mode.

As shown in FIG. 1, while unit 1 is scanning the last-recorded information, vertical synchronization signals are applied through a line 7 to signal generator 3 to synchronize same. The vertical synchronization signals at the output of signal generator 3 are applied to one input of an AND gate 9 whose other input receives the vertical synchronization signals furnished by unit 1. An output from AND gate 9 therefore indicates synchronization between the scanned signals and the signals furnished by signal generator 3. The output of AND gate 9 is used to enable the equipment to be switched from the reproducing to the recording mode.

The above-described operation will be described in greater detail with reference to FIG. 2. As shown in FIG. 2, a magnetic tape 12 is driven by a capstan 13 between two reels 10, 11, which alternately act as take-up and supply reels. Magnetic head 16 is connected to the input of a video amplifier 17, and to the output of a video amplifier 19.

A synchronization signal separator 18, which is a standard unit readily commercially available, is connected to the output of video amplifier 17. Horizontal synchronization signals separated from the video signals at the output of amplifier 17 are furnished on a line 34, vertical synchronization signals on a line 7. The signals on lines 34 and 7 are herein referred to as reproduced horizontal and vertical synchronization signals, respectively. Video amplifier 17 is enabled only while the equipment is in the reproducing mode. The video signals generated by magnetic head 16 when the equipment is in the reproducing mode are available at the output of amplifier 17 at a terminal 22.

Capstan 13 is driven by an electromotor 14. The speed of tape advance is therefore controlled by controlling the speed of motor 14. For this purpose, the reproduced horizontal synchronization signals are applied to one input of an AND gate 33 whose other input is energized only while the equipment is in the reproducing mode. Signals at the output of AND gate 33 are applied to one input of a discriminator 21 and are phase compared with the horizontal synchronization signals furnished by signal generator 3. During the recording mode, a tacho-generator 15 furnishes a sequence of pulses whose pulse repetition rate is indicative of motor speed. These pulses are applied to one input of an AND gate 32 which is enabled only when the equipment is in the recording mode. The output of AND gate 32 is connected to discriminator 21 in common with the output of AND gate 33. During the recording mode, discriminator 21 therefore phase compares the output of AND gate 32 to the horizontal synchronization signals furnished by signal generator 3. Any difference in phase results in a signal at the output of discriminator 21 which controls a speed control amplifier 20 whose output in turn controls the speed of the electromotor. The electromotor speed will be changed until such time as the output of discriminator 21 indicates time coincidence between the signals applied to its two inputs.

As previously mentioned, the horizontal and vertical synchronization signals furnished by signal generator 3 control the scanning of the image by television camera 2.

Signal generator 3 has a synchronization input. This is connected to the output of an AND gate 24. The signals at the output of signal generator 3 are phase synchronized to the signals applied at its synchronization input. AND gate 9 will therefore furnish output signals without any substantial time delay.

At the start of the recording of a new section of video information, switch 6 is closed so that a voltage is applied through OR gate 25 to a flip-flop 28. Flip-flop 28 is set and causes a monostable multivibrator 29 to be switched to the unstable state. This in turn causes the setting of a flip-flop 31. When flip-flop 31 is in the set state, the equipment is in the reproducing mode. The set output of flip-flop 31 enables video amplifier 17, AND gate 24, and AND gate 33. The set output of flip-flop 28 enables speed control amplifier 20. Flip-flops 28 and 29 are dynamic RS flip-flops. The output of discriminator 21 starts to synchronize the speed of the electromotor to the horizontal synchronization signals furnished by signal generator 3. However, signal generator 3 is synchronized to the reproduced vertical synchronization signals furnished by synchronization signal separator 18 almost immediately. When coincidence is achieved between the vertical synchronization signals at the output of signal generator 3 and the signals applied to its synchronization input, these vertical synchronization signals appear at the output of AND gate 9. They are applied to the second input of AND gate 30 whose first input is still energized by the closure of switch 6. The output of AND gate 30 switches flip-flop 31 to the reset state. The equipment is changed from the reproducing mode to the recording mode.

To prevent the possibility that stray pulses applied to the inputs of AND gate 9 will cause an erroneous switching to the recording mode, a counter 9' may be provided. The signals at the output of AND gate 19 are applied to the counting input of the counter, while the counter output, following, for example, two sequential counts is applied to the input of AND gate 30. The same output of the counter which is applied to AND gate 30 can, after a slight delay, be used to reset the counter.

It should also be noted that while monostable multivibrator 29 is in the unstable state (e.g. for a time of appr. 200 ms) switch 23 controls electromotor 14 so that tape 12 is rewound for a very short portion.

Operation of a stop switch 35 allows the operation of the equipment to be stopped independent of the mode it is in. Operation of switch 26 and 27 causes the equipment to be switched to the reproducing mode and a rewind process, respectively. The present invention can be applied to information recording and reproducing equipment of almost any type. It results in the recording of new information without a gap following the previously recorded information and, further, requires a very short startup or synchronization time.

Various changes and modifications may be made within the scope of the inventive concepts.

I claim:

1. In television equipment operable in a recording and in a reproducing mode, and comprising information carrier means (12), read/write means (16) for recording signals on and reading signals from said information carrier means, means (2) for furnishing information signals to said read/write means when said equipment is operative in said recording mode, synchronization signal generator means (3) for furnishing horizontal and vertical synchronization signals to said information signal furnishing means, means (14, 20, 21, 32, 33) connected to said synchronization signal generator means for driving said record carrier means past said read/write means at a speed controlled by selected ones of said synchronization signals, and means (6) operative under external control for initiating reproduction of a brief section of last-recorded information on said information carrier means prior to recording of next subsequent information thereon, whereby said read/write means furnishes reproduced horizontal and vertical synchronization signals during said reproduction of said brief section of last-recorded information, the improvement comprising means (18, 24) interconnected between said read/write means and said synchronization signal generator means for synchronizing said synchronization signal generator means to predetermined ones of said reproduced synchronization signals;

further comprising means (9,30) for automatically switching said equipment to said recording mode when said synchronization signals furnished by said synchronization signal generator means are in synchronism with said reproduced synchronization signals;

mode selector means (31) for switching said equipment to said recording mode or to said reproducing mode in response to, respectively, a first or a second mode selector signal; and wherein said automatic switching means comprises an AND gate (9) having a first input connected to said synchronization signal generator means, a second input connected to said read/write means, and an output connected to said mode selector means for furnishing said first mode selector signal thereto.

2. Equipment as set forth in claim 1 wherein said selected ones of said synchronization signals are said horizontal synchronization signals.

3. Equipment as set forth in claim 2, wherein said predetermined ones of said reproduced synchronization signals are said vertical synchronization signals.

4. Equipment as set forth in claim 3, wherein said read/write means comprises a magnetic head; and
wherein said information carrier means comprises a magnetic tape.

5. Equipment as set forth in claim 4, wherein said read/write means further comprises first video amplifier means (17) connected to said read/write head for amplifying signals read out from said magnetic tape and furnishing corresponding amplified reproduced television signals, synchronizing signal separator means for separating horizontal and vertical synchronization signals from said amplified reproduced television signals, thereby furnishing said reproduced horizontal and vertical synchronization signals, and second video amplifier means (19) interconnected between said camera and said read/write means for furnishing amplified television signals to said read/write means when said equipment is in said recording mode.

* * * * *